Feb. 5, 1952
C. HOLLERITH
2,584,703
COMBINATION COUPLING AND GOVERNOR
FOR PRODUCING AXIAL MOVEMENTS
Filed March 1, 1946
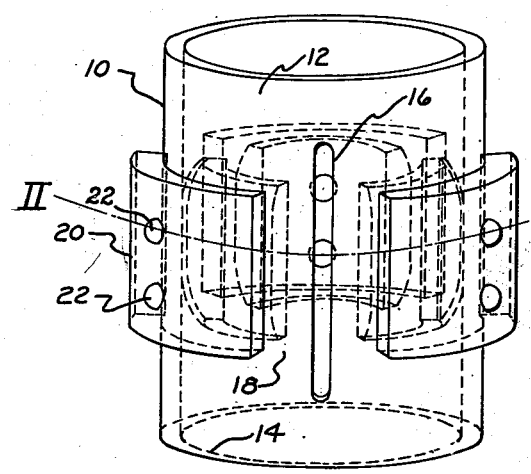
Fig. I.
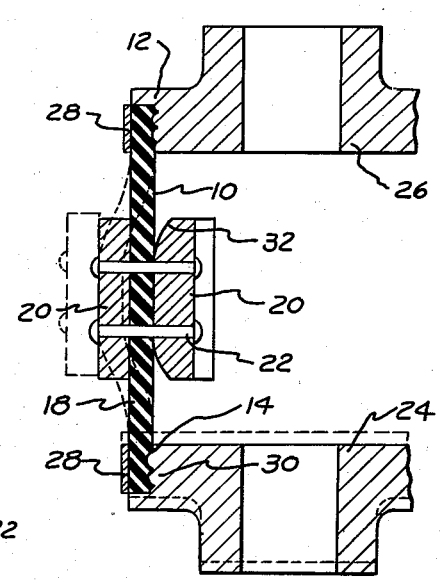
Fig. III.
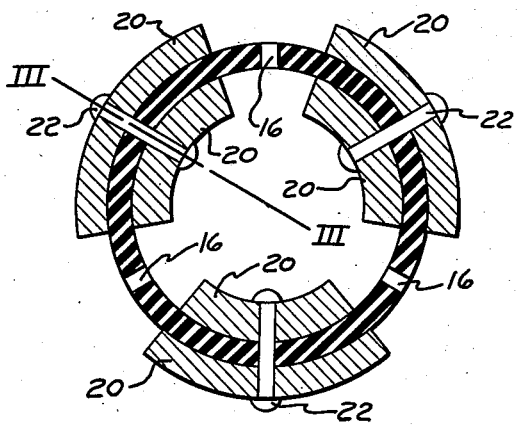
Fig. II.
Inventor
CHARLES HOLLERITH
By Beaman & Patch
Attorneys Patented Feb. 5, 1952

2,584,703

UNITED STATES PATENT OFFICE 2,584,703

COMBINATION COUPLING AND GOVERNOR FOR PRODUCING AXIAL MOVEMENT

Charles Hollerith, Jackson, Mich., assignor to Lake State Products, Inc., Jackson, Mich., a corporation of Michigan Application March 1, 1946, Serial No. 651,276

1 Claim. (Cl. 264—18)

The present invention relates to improvements in a combination flexible coupling and governor for producing relative axial movement between two parts.

It is an object of the present invention to provide a device which may be inserted between rotated driven and driving parts with all the desirable characteristics of a flexible coupling and at the same time provide relative axial movement between the driving and driven parts upon predetermined rotational speeds.

Another object of the invention is to provide a combination flexible coupling and governor in the form of a section of flexible hose having intermediate portions defined by axial slits.

A further object of the invention is to provide a flexible coupling and governor for producing relative axial movement between the driving and driven parts, in which axially extending flexible strips carry weights intermediate to their ends.

A still further object of the invention is to provide a combination coupling and governor in the form of a section of rubber hose having sufficient body and resiliency to continuously act to retain a cylindrical form and having an intermediate portion weighted and defined by longitudinal slits to permit radial displacement under predetermined centrifugal forces.

These and other objects residing in the combination, construction and arrangement of parts will be more fully disclosed and treated in the following specification and the appended claim.

In the drawing,

Fig. 1 is a perspective view of a section of cylindrical hose fabricated according to the principles of the present invention.

Fig. 2 is a cross-sectional view taken on line II—II of Fig. 1, and

Fig. 3 is a vertical cross-sectional view showing the device of Fig. 1 assembled between driven and driving parts, the section being taken on line III—III of Fig. 2.

The flexible coupling and governor member 10 preferably takes the form of a short section of standard type hose used in hydraulics for conducting fluids under relatively high pressure. It may be of rubber construction, either natural or synthetic, with fabric or other type of conventional reinforcement. For convenience in attaching the coupling between suitable driven and driving parts, the upper and lower portions 12 and 14 are preferably retained in complete cylindrical form with the intermediate portion of the hose section being divided by spaced longitudinal slits 16 between which are defined arcuate strips 18 extending between the upper and lower portions 12 and 14. Connected to the arcuate strips 18, either on one or both sides, are suitable weights 20 which are shown as secured in position by rivets 22.

In Fig. 3, the coupling 10 is shown connected between the drive part 24 and the driven part 26 through suitable clamps 28 to secure the upper and lower portions 12 and 14 to the cylindrical shoulders 30. To facilitate the connection, the shoulders 30 may be roughened in the manner indicated. It is also to be noted in Fig. 3 that the inside weight 20 has arcuate upper and lower ends 32 so as to conform more readily to the normal shape the arcuate strips 18 take under centrifugal action. In the dotted outline is indicated the manner in which the strips 18 are thrown radially outwardly by centrifugal forces, causing one or both of the parts 24 and 26 to move into the dotted-line position indicated.

It will be understood that the coupling 10 because of its resilient characteristics will have an inherent tendency to assume the cylindrical shape shown in full line in Fig. 3. It is only when the centrifugal forces due to rotation overcome this inherent tendency to retain its original form do the strips 18 have radial movement toward the dotted line position shown in Fig. 3. As the rate of rotation is reduced, the strips 18 will be drawn inwardly toward the full-line position shown in Fig. 3 with the result that the inherent resilient characteristics of the combination coupling and governor device 10 may be employed to position the driving part 24 and the driven part 26 in the full-line position shown in Fig. 3, without the employment of any auxiliary resilient means against which the centrifugal action of the strips 18 upon rotation would be required to act.

It should be apparent from the foregoing description that I have provided a simple and inexpensive coupling and governor performing satisfactorily as a flexible drive and at the same time the action of rotational forces will exert endwise forces upon parts between which the coupling 10 may be connected.

It will be appreciated by those skilled in the art that in some cases the weights 20 could be omitted and the strips 18 will function to provide all of the centrifugal action required.

Having thus described my invention, what I claim as new and desire to cover by Letters Patent is:

A combination flexible drive coupling and governor designed to be attached between driving and driven members for rotation about its longitudinal axis, comprising a tubular section of flexible resilient material but of a stiffness sufficient to render the tubular section self-supporting to form a coupling connection, said tubular section having an intermediate portion with axial slots therein at circumferentially spaced intervals defining arcuate strip portions adapted to yield under the influence of centrifugal forces upon rotation about its longitudinal axis to permit the intermediate portion of the tubular section to expand radially outwards to shorten the longitudinal length thereof and thereby function as a governor, said tubular section having opposite cylindrical end portions integral with said arcuate strip portions.

CHARLES HOLLERITH.

REFERENCES CITED

The following references are of record in the file of this patent:

UNITED STATES PATENTS

| Number | Name | Date |
|---|---|---|
| 85,763 | Pracy | Jan. 12, 1869 |
| 695,464 | Lombard | Mar. 18, 1902 |
| 1,233,276 | Kerr | July 10, 1917 |
| 1,886,546 | Hoffman | Nov. 8, 1932 |
| 2,036,114 | Bembry | Mar. 31, 1936 |
| 2,124,281 | Bedford | July 19, 1938 |